United States Patent
Golden

[11] 3,823,971
[45] July 16, 1974

[54] GAFF HOOK
[76] Inventor: Alvin C. Golden, P.O. Box 942, Scottsdale, Ariz. 85252
[22] Filed: Aug. 8, 1973
[21] Appl. No.: 386,703

[52] U.S. Cl. .................................. 294/26, 294/110 A
[51] Int. Cl. .......................... A01k 97/14, B65g 7/12
[58] Field of Search ... 294/26, 61, 103, 104, 110 R, 294/110 A; 43/5, 6, 15, 37

[56] References Cited
UNITED STATES PATENTS
| | | | |
|---|---|---|---|
| 949,750 | 2/1910 | Bettis | 294/110 A |
| 1,293,127 | 2/1919 | Lantz | 43/37 |
| 2,623,777 | 12/1952 | Myers | 294/26 X |
| 2,924,482 | 2/1960 | Gibson | 294/26 |

Primary Examiner—Evon C. Blunk
Assistant Examiner—Johnny D. Cherry
Attorney, Agent, or Firm—Warren F. B. Lindsley

[57] ABSTRACT

A fish landing implement comprising a pair of opposed gaff hooks which are secured in movable cooperating relationship to each other in a pole or handle for automatically imaling a fish on both sides of its body with gaff hooks by a simple manipulation of the pole.

8 Claims, 3 Drawing Figures

PATENTED JUL 16 1974  3,823,971

GAFF HOOK

BACKGROUND OF THE INVENTION

This invention pertains to gaff hooks or similar hand held implements which are used to assist in the landing of large, heavy fish.

FIELD OF THE INVENTION

This invention is particularly directed to a hand held implement or gaff hook structure which may be used by a lone fisherman to successfully land a large, heavy fish.

DESCRIPTION OF THE PRIOR ART

Many types of gaff hooks or similar implements have been devised and used in the past for the purpose of assisting fishermen in the landing of large, heavy fish which usually consisted of a long pole or handle having a strong, sharp hook securely attached to one end of the pole. In some such structures, a sharp pointed spear like structure having an integral curved shaped end with a barb near its sharpened point was used for the same purpose.

Both of the above described types of gaff hook structures have many disadvantages including the fact that they are usually quite heavy and awkward to use in performing their intended function, especially for a lone fisherman. In many cases, large fish have escaped from the gaff hook or implement by twisting its body violently thus tearing away from the single gaff hook structure which merely penetrates one side of the fish resulting in the loss of the fish or the necessity of using another gaff hook to assure a successful landing of the fish.

Various types of complicated fish hook structures employing a plurality of curved and pivoted gaff hooks actuated by the fish pulling on a baited single hook for impaling the body of the fish in several places at the same time have been used to assist a fisherman in landing a large fish. These devices, however, only help in bringing the fish in close proximity to the fishing vessel and because they are attached to a flexible fishing line or cable could not possibly function to assist the fisherman in lifting and landing in the boat a large, heavy fish.

Therefore, in accordance with the invention claimed, a new and improved gaff hook structure or implement has been devised which may be utilized to assist a lone fisherman in the successful landing of a large, heavy fish with a minimum of physical effort.

SUMMARY OF THE INVENTION

It is, therefore, one object of this invention to provide an improved, hand held gaff hook or fish landing implement.

Another object of this invention is to provide an improved gaff hook or fish landing implement which is light in weight, inexpensive to manufacture and consists of a minimum of movable parts, all of which can be quickly and easily replaced, if necessary.

A further object of this invention is to provide an improved, hand held fish landing implement having two similarly shaped cooperating hooks or grappling elements, one of which is slidably mounted in the end of the implement and the other of which is pivotally mounted on the circumference of the handle.

A still further object of this invention is to provide a simple, lightweight fish landing device that utilizes a pull against a first slidable gaff hook impaled in the body of the fish to automatically cause a second pivoted gaff hook to impale the body of the fish in a plier like clamping action at a point directly opposite the impalement of the first gaff hook.

Further objects and advantages of the invention will become apparent as the following description proceeds and the features of novelty which characterize this invention will be pointed out with particularity in the claims annexed to and forming a part of this specification.

DESCRIPTION OF THE PREFERRED EMBODIMENT

Figure 1:
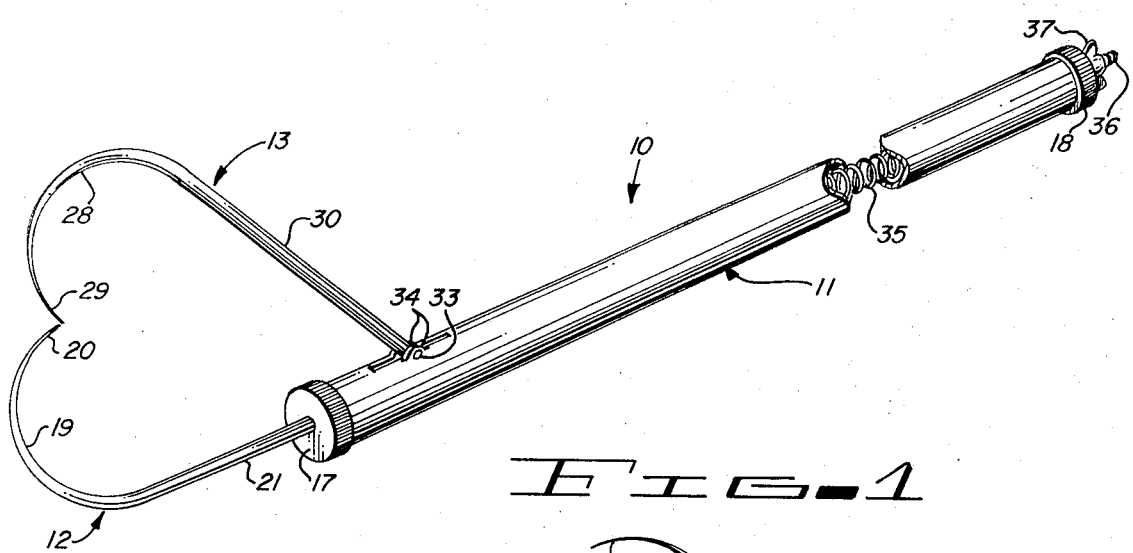
FIG. 1 is a perspective view of the assembled gaff hook or fish landing implement of this invention showing the separate gaff hooks in their closed positions.

Referring to the drawing by characters of reference, FIG. 1 discloses a gaff hook or implement 10 which comprises an elongated hollow pole or handle member 11 having a first solid and sturdy gaff hook member 12 slidably mounted in one end of the hollow pole structure. A second similar gaff hook member 13 is pivotally mounted on the outer circumference of the pole a predetermined distance to the rear of the same end and in the same relative plane as the first gaff hook member 12.

Figure 2:
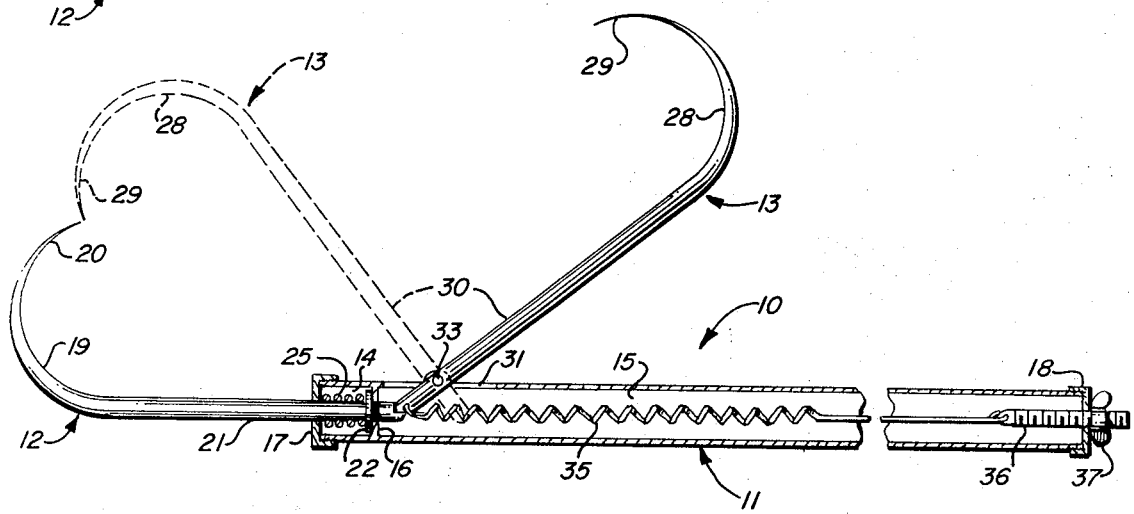
FIG. 2 is a longitudinal sectional view of the assembled implement shown in FIG. 1 illustrating in solid and dotted lines the respective positions of the separate gaff hooks when in open and closed positions.

Handle 11 is preferably tubular in form and made of lightweight metal, such as anodized or chrome plated aluminum or of a high density plastic having great strength made in any desirable length depending on the conditions and usage for which the assembled implement 10 is intended. The bore of handle 11 is divided into two separate portions defining two compartments, namely a first comparatively short compartment 14 and a second comparatively long compartment 15 by a transverse integral wall or partition 16. Each end of handle 11 is provided on its outer circumference with a male thread which is adapted to received in threaded cooperation closure caps 17 and 18 as shown in FIGS. 1 and 2.

The first gaff hook member 12 is provided with a curved portion 19 having a sharp point 20 at its outer end and an integral straight shank portion 21 which extends a limited distance through an aperture 17' in closure cap 17 and an aperture 16' in the transverse portion wall 16. The distance of penetration is controlled by the location of a stop washer 22. Stop washer 22 is secured to the shank portion 21 of the gaff hook member 12 by means of welding or otherwise. The extreme end of the straight shank portion 21 of gaff hook member 12 extends into compartment 15 at which point it is provided with a right angled notch or cutout 23 having a rounded cam-like end surface 24.

Figure 3:
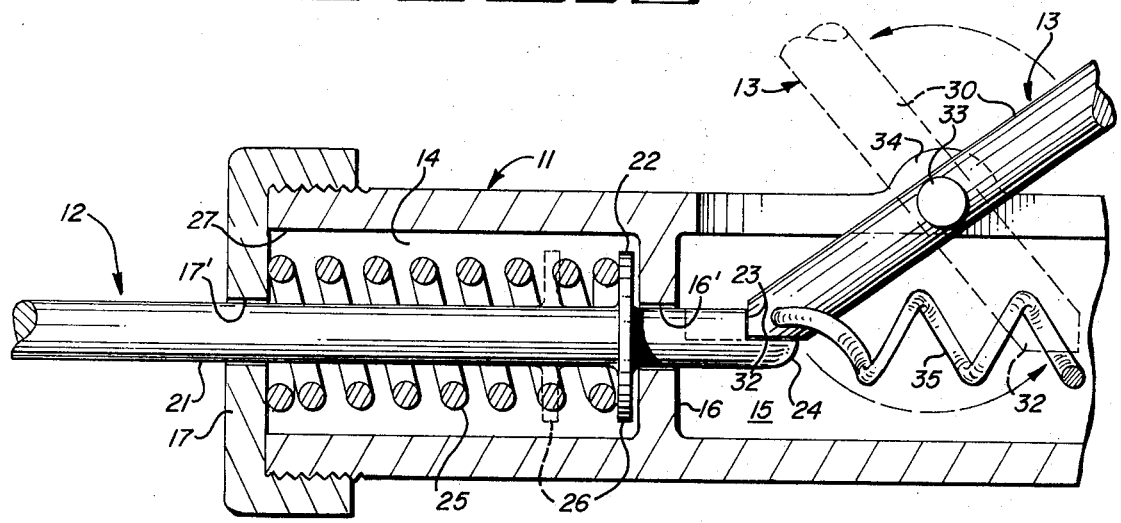
FIG. 3 is an enlarged fragmentary longitudinal sectional view of one end portion of the assembled implement shown in FIG. 2 illustrating the respective relation of the various components when the separate gaff hooks are in open position (in solid line) and when in closed position (in dotted line).

Surrounding the straight slidable shank portion 21 in compartment 14 is positioned a compression spring 25 which bears against the face 26 of stop washer 22 and the inside face 27 of closure cap 17. Cap 17 may be adjusted threadedly to control the compression limits of spring 25 and the sliding movement of shank portion 21 of gaff hook member 12 in apertures 16' and 17' provided in the transverse wall 16 and closure cap 17, respectively. Spring 25 normally retains shank portion 21 of gaff hook member 12 in the position shown in compartment 15 illustrated in full lines in FIGS. 2 and 3.

The pivoted gaff hook member 13 is similar in shape and size to the slidable gaff hook member 12 and comprises a curved portion 28 with a sharp point 29 at its outer end and an integral straight shank portion 30.

Shank portion 30 is adapted to extend through an elongated slot 31 in the outer circumferential surface of handle 11 into compartment 15. At a predetermined distance above its blunt cam shaped end 32, shank portion 30 is pivotally mounted on a pin 33 positioned between a pair of upstanding lugs 34 formed in transverse alignment at each side of the elongated slot 31 in hollow handle 11. Thus, gaff hook member 13 may be swung in an arc of about 90° about its pivot pin 33 and in the same plane as the opposed slidable gaff hook member 12 to bring their sharp pointed ends 20 and 29 when activated substantially together.

Closely adjacent the blunt cam shaped end 32 of the straight shank portion 30 of the pivoted gaff hook member 13 is attached in any suitable manner one end of a long tension spring 35. Spring 35 extends through the hollow bore of handle 11 in compartment 15 to a point near cap 18 where it is connected to a threaded adjusting screw 36. Screw 36 extends through an aperture in the center of closure cap 18 and is fitted with a threaded wing nut 37 which may be utilized to adjust the tension or pull of spring 35 on the short end of the pivoted shank portion 30 of gaff hook member 13 for exerting on gaff hook member 33 a forward radial thrust when released from its cocked or open position as shown in full lines in FIGS. 2 and 3.

In order to place and maintain the pivoted gaff hook member 13 in the cocked or open position described above, the fisherman utilizing the implement would pull back or rotate the hook member in a clockwise direction about its pivot pin 33 against the continued tension of spring 35 until its blunt cam shaped end 32 contacted the rounded cam like surface 24 at the end of the shank portion 21 of the slidable gaff hook member 12. This action is continued until shank portion 21 is forced against the pressure of spring 25 a sufficient distance to allow the blunt cam shaped end of the shank portion 30 to enter the right angled notch or cutout 23 at the end of the slidable shank 21 at which time the pressure exerted on the face 26 of stop washer 22 by spring 25 would cause shank 21 and its notch 23 to be moved into locked relation with the blunt cam shaped end 32 of the shank portion 30 of the pvioted gaff hook member 13. Gaff hook member is maintained in cocked or open position relative to the opposed slidable gaff hook member 12 until released by a simple manual action of the fisherman.

OPERATION

After the fisherman has caught a large fish on his line and carefully brought it to him within reach by his gaff hook or implement, he then picks up the implement by its handle 11 and reaches out so that the opposed gaff hook members 12 and 13 in cocked or open position are positioned close to the body of the fish at a point near or slightly behind its gills. He then impales the body of the fish with the sharp pointed curved end 20 of the slidable gaff hook member 12.

With the slidable gaff hook member 12 securely impaled in one side of the fish, he then exerts a pull or quick jerk on handle 11 which action causes the straight shank portion 21 of the gaff hook member 12 to be pulled out from the end of the handle and by such force compresses spring 25 a sufficient amount to allow the blunt cam shaped end 32 of shank portion 30 of the second pivoted gaff hook member 13 to escape from its securely locked position in the notch 23 at the end of the shank portion 21. This action causes tension spring 35 to immediately exert its full pulling force to the end 32 of the pivoted shank portion 30 causing gaff hook member 13 to move in an arc with great speed and sufficient force to penetrate or impale the other side of the fish's body with its sharp pointed end 29. This action in combination with gaff hook member 12 provides a pincer or plier like grip on the body of the fish.

After the above procedure has been accomplished, it would require little physical effort on the part of the fisherman to utilize handle 11 to pull and lift a large heavy fish from the water. After the fish has been landed and the respective gaff hook members 12 and 13 removed from its body, the implement can be cocked again with its hook members in open position ready for use again as described above.

Although but one embodiment of the invention has been shown and described, it will be apparent to those skilled in the art that various changes and modifications may be made therein without deparing from the spirit of the invention or from the scope of the appended claims.

What is claimed is:

1. An implement for landing fish comprising:
 a hollow cylindrical handle divided into first and second coaxially aligned compartments separated by an apertured partition,
 a first impaling hook means comprising a first shank axially mounted in said first compartment and having one end extending through said aperture in said partition into said second compartment and the other end provided with a hook outside of one end of said handle,
 a first spring means for biasing said first shank a predetermined distance into said second compartment,
 a second impaling hook means comprising a second shank pivotally mounted on the periphery of said handle with one end thereof extending through an aperture in the periphery of said handle into said second compartment adjacent said one end of said first shank,
 a second spring means mounted within said second compartment for biasing said one end of said second shank away from said one end of said first shank, and
 catch means having cooperating interlocking parts mounted on said one end of each of said first and second shanks, said parts being interlocked by rotating said second shank to a position causing said second hook to be spaced from said first hook, whereby pressure exerted on said first hook causing longitudinal movement of said first shank away from said one end of said second shank causes disengagement of said parts of said catch means, said disengagement of said catch means causes rotation of said second shank under the biasing effect of said second spring means placing said second hook adjacent said first hook.

2. The implement for landing fish set forth in claim 1 wherein:

said first spring means is positioned within said first compartment.

3. The implement for landing fish set forth in claim 2 wherein:

cap means are threadedly mounted on the end of the handle surrounding said first compartment for adjusting the biasing effect of said first spring means.

4. The implement for landing fish set forth in claim 3 wherein:

a second cap is threadedly mounted on the end of said handle surrounding said second compartment for containing said second spring means.

5. The implement for landing fish set forth in claim 4 wherein:

said second cap is provided with an aperture extending therethrough, a threaded bolt is fixedly attached to one end of said second spring means and extending through said aperture in said second cap outside of said handle, and a wing nut is threadedly attached to the free end of said threaded bolt outside of said handle for varying the tension of said second spring means.

6. The implement for landing fish set forth in claim 1 wherein:

said first spring means comprises a compression spring, and said second spring means comprises a tension spring.

7. The implement for landing fish set forth in claim 1 wherein:

said one end of said first shank is provided with a notch extending a predetermined distance along its length, and said one end of said second shank is provided with a pointed cam end for rotatively engaging the walls of said notch for cooperative locking engagement therewith when said second hook is spaced in open position from said first hook.

8. The implement for landing fish set forth in claim 1 wherein:

said first and second hook means move relative to each other in a common plane.

* * * * *